US012489316B2

(12) United States Patent
Zou et al.

(10) Patent No.: US 12,489,316 B2
(45) Date of Patent: Dec. 2, 2025

(54) WIRELESS CHARGING DEVICE

(71) Applicant: Delta Electronics (Shanghai) Co., Ltd., Shanghai (CN)

(72) Inventors: Benze Zou, Shanghai (CN); Shengyi Yang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 769 days.

(21) Appl. No.: 17/856,797

(22) Filed: Jul. 1, 2022

(65) Prior Publication Data
US 2023/0074957 A1 Mar. 9, 2023

(30) Foreign Application Priority Data
Sep. 3, 2021 (CN) .......................... 202111031659.X

(51) Int. Cl.
*H02J 50/10* (2016.01)
*H02J 7/00* (2006.01)
*H02J 50/00* (2016.01)
*H05K 7/20* (2006.01)

(52) U.S. Cl.
CPC ............ *H02J 50/10* (2016.02); *H02J 7/0044* (2013.01); *H02J 50/005* (2020.01); *H05K 7/20172* (2013.01)

(58) Field of Classification Search
CPC ......... H02J 50/10; H02J 7/0044; H02J 50/005
USPC .......................................... 320/108; 307/104
See application file for complete search history.

(56) References Cited

U.S. PATENT DOCUMENTS 5,772,500 A * 6/1998 Harvey ..................... G06F 1/20
                                                          415/206
10,782,752 B2   9/2020 Koo et al.
2018/0224909 A1* 8/2018 Koo ........................ H02J 50/12

FOREIGN PATENT DOCUMENTS

| CN | 208479249 U | 2/2019 |
| CN | 210380388 U | 4/2020 |
| CN | 111585313 A | 8/2020 |
| CN | 109729689 B | 9/2020 |
| CN | 211456759 U | 9/2020 |
| CN | 211744148 U | 10/2020 |
| CN | 211908392 U | 11/2020 |
| CN | 211981548 U | 11/2020 |
| CN | 112054570 A | 12/2020 |
| CN | 112311033 A | 2/2021 |
| CN | 212543377 U | 2/2021 |

(Continued)

Primary Examiner — Richard V Muralidar
(74) Attorney, Agent, or Firm — KIRTON McCONKIE; Evan R. Witt

(57) ABSTRACT

A wireless charging device is provided. The plurality of protrusion portions are utilized to form the first gap between the top plate and the mobile device, so as to increase the distance formed between the top plate and the mobile device. Consequently, the first interfacial thermal resistance formed between the transmitter coil assembly and the receiver coil located in the mobile device is increased, and the second heat source generated from the transmitter coil assembly is dissipated through the wireless charging device instead of being transferred to the receiver coil located in the mobile device. In that, the temperature of the mobile device is controlled to be under the tolerance temperature threshold value during the charging process of the wireless charging device. Consequently, the charging power is enhanced, and the charging speed is increased.

15 Claims, 8 Drawing Sheets

(56) References Cited

FOREIGN PATENT DOCUMENTS

| | | |
|---|---|---|
| CN | 212627194 U | 2/2021 |
| CN | 113258622 A | 8/2021 |
| CN | 213879392 U | 8/2021 |
| KR | 101748835 B1 | 6/2017 |
| KR | 101879656 B1 | 7/2018 |
| KR | 20210101887 A | 8/2021 |

\* cited by examiner

WIRELESS CHARGING DEVICE

CROSS-REFERENCE TO RELATED APPLICATION

This application claims priority to China Patent Application No. 202111031659.X filed on Sep. 3, 2021, the entire contents of which are incorporated herein by reference for all purposes.

FIELD OF THE INVENTION

The present disclosure relates to a wireless charging device, and more particularly to a wireless charging device for enhancing the charging power and increasing the charging speed.

BACKGROUND OF THE INVENTION

Recently, with the development of wireless charging technology, the wireless charging functions of mobile devices such as mobile phones have become more popular for consumers because of their own convenience. However, a great deal of heat is generated during the wireless charging process, both of the wireless charging device and the mobile device. Generally, the performance and the life of the mobile device are affected directly by the excessively high temperature, so as to affect the experience effect of user.

A conventional wireless charging device includes a transmitter coil and a transmitter driving board. The transmitter driving board receives the external electric energy to drive the transmitter coil. On the other hand, the mobile device includes a receiver coil having an electromagnetic coupling effect with the transmitter coil. Due to the electromagnetic coupling effect between the receiver coil and the transmitter coil, and the electric energy outputted from the transmitter coil is received by the receiver. While the mobile device is charged by the wireless charging device, the transmitter coil, the transmitter driving board of the wireless charging device and the receiver coil of the mobile device are considered as heat sources, respectively. In addition, there are two thermal resistances existed between the transmitter coil and the transmitter driving board and between the transmitter coil and the receiver coil, respectively.

When the mobile device needs to be charged, the mobile device is disposed and attached to the wireless charging device. During the wireless charging process, the distance formed between the transmitter coil of the wireless charging device and the receiver coil of the mobile device is short, so that the thermal resistance formed between the transmitter coil and the receiver coil is small. Consequently, the thermal source generated from the transmitter coil is transferred to the mobile device through the wireless charging device instead of being dissipated to the surroundings. Moreover, the thermal source generated from the transmitter driving board is transferred to the mobile device through the transmitter coil, so that a great deal of heat is generated from the mobile device easily. Furthermore, as the temperature of the mobile device exceeds a critical temperature, the charging operation cannot be continued or the mobile device has to be charged at a lower power level. Consequently, the charging power and the charging speed of the mobile device are reduced.

Therefore, there is a need of providing an improved wireless charging device in order to overcome the drawbacks of the conventional technologies.

SUMMARY OF THE INVENTION

An object of the present disclosure is to provide a wireless charging device. A mobile device is wirelessly charged by the wireless charging device and includes a receiver coil. The wireless charging device includes a casing, a transmitter driving board, a transmitter coil assembly and a fan. The casing includes a top plate, a bottom plate, a plurality of lateral walls, a partition plate, a supporting wall and an accommodation space. The top plate and the bottom plate are opposite to each other. The top plate includes an upper surface, a lower surface, a plurality of protrusion portions and a plurality of holes. The upper surface and the lower surface of the top plate are opposite to each other. The plurality of protrusion portions are extended from the upper surface of the top plate faced away the bottom plate. The mobile device is disposed on the top plate through the plurality of protrusion portions, so as to form a first gap between the top plate and the mobile device. The plurality of holes run through the top plate. The partition plate and the supporting wall are disposed between the top plate and the bottom plate, respectively. A second gap is formed between the supporting wall and the top plate. The accommodation space is divided into a first accommodation space, a second accommodation space and a third accommodation space through the partition plate and the supporting wall. The first accommodation space is located between the top plate and the partition plate. The second accommodation space is located between the partition plate and the bottom plate. The supporting wall is located between the first accommodation space and the third accommodation space. The transmitter driving board is disposed in the second accommodation space for receiving and converting an external electric energy into a driving electric energy during an operation of the wireless charging device. The transmitter coil assembly is disposed in the first accommodation space and electromagnetically coupled with the receiver coil. The transmitter coil assembly receives the driving electric energy from the transmitter driving board and transfers the driving electric energy to the receiver coil during the operation of the wireless charging device, so that the mobile device is wirelessly charged by the driving electric energy. A third gap is formed between the transmitter coil assembly and the top plate. A first airflow channel is formed by the first gap, the plurality of holes, the third gap, the second gap and the third accommodation space collaboratively, so that an airflow is allowed to flow through the first airflow channel. The fan includes an inlet and an outlet. The inlet is disposed adjacent to the third accommodation space. The outlet is disposed adjacent to the bottom plate. The airflow flowing through the first airflow channel is inhaled to the fan through the inlet and discharged out through the outlet.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

Figure 1:
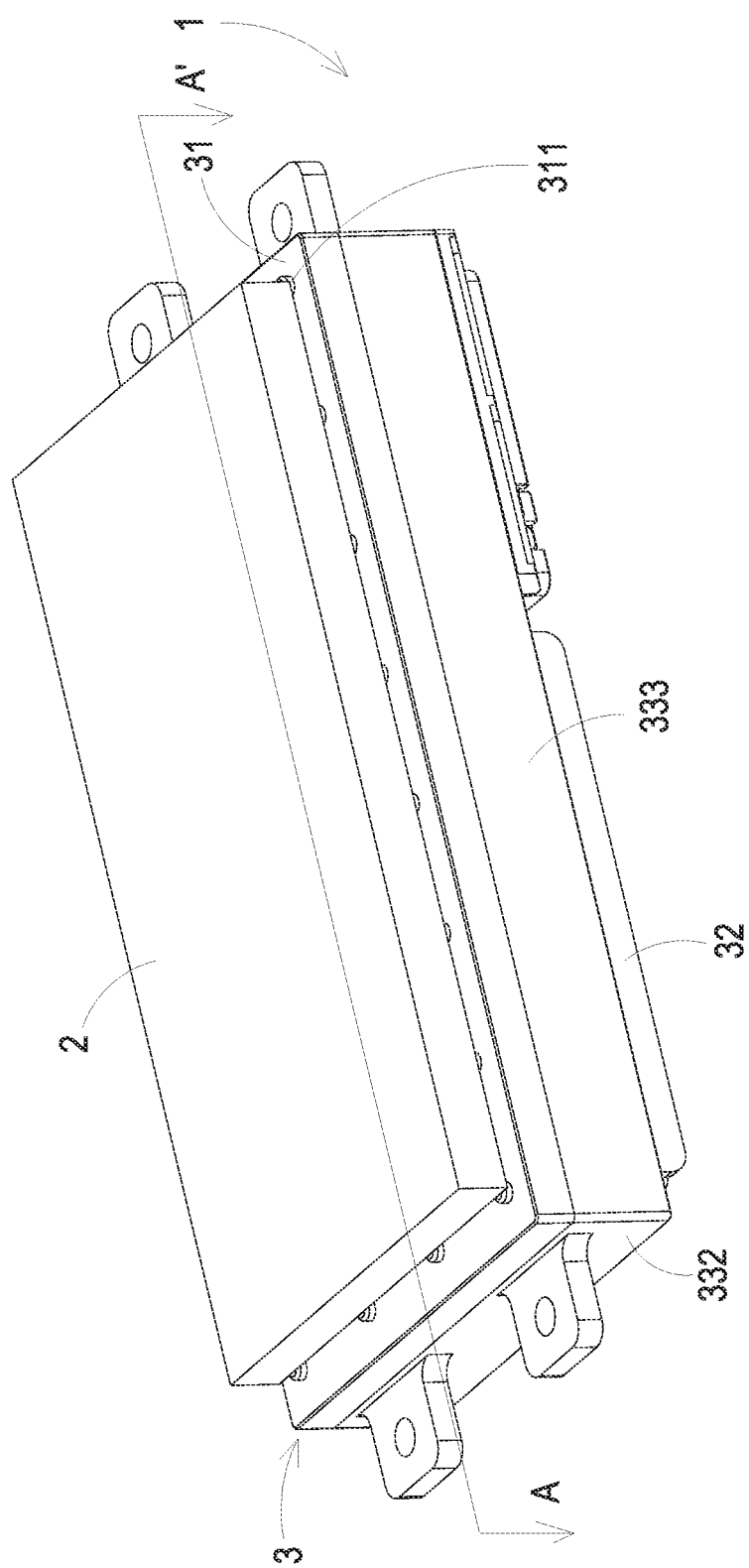
FIG. 1 is a schematic perspective view illustrating the appearance of a wireless charging device with a mobile device disposed thereon according to a first embodiment of the present disclosure.

The present disclosure will now be described more specifically with reference to the following embodiments. It is to be noted that the following descriptions of embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "outwardly," "lower," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments.

Figure 2:
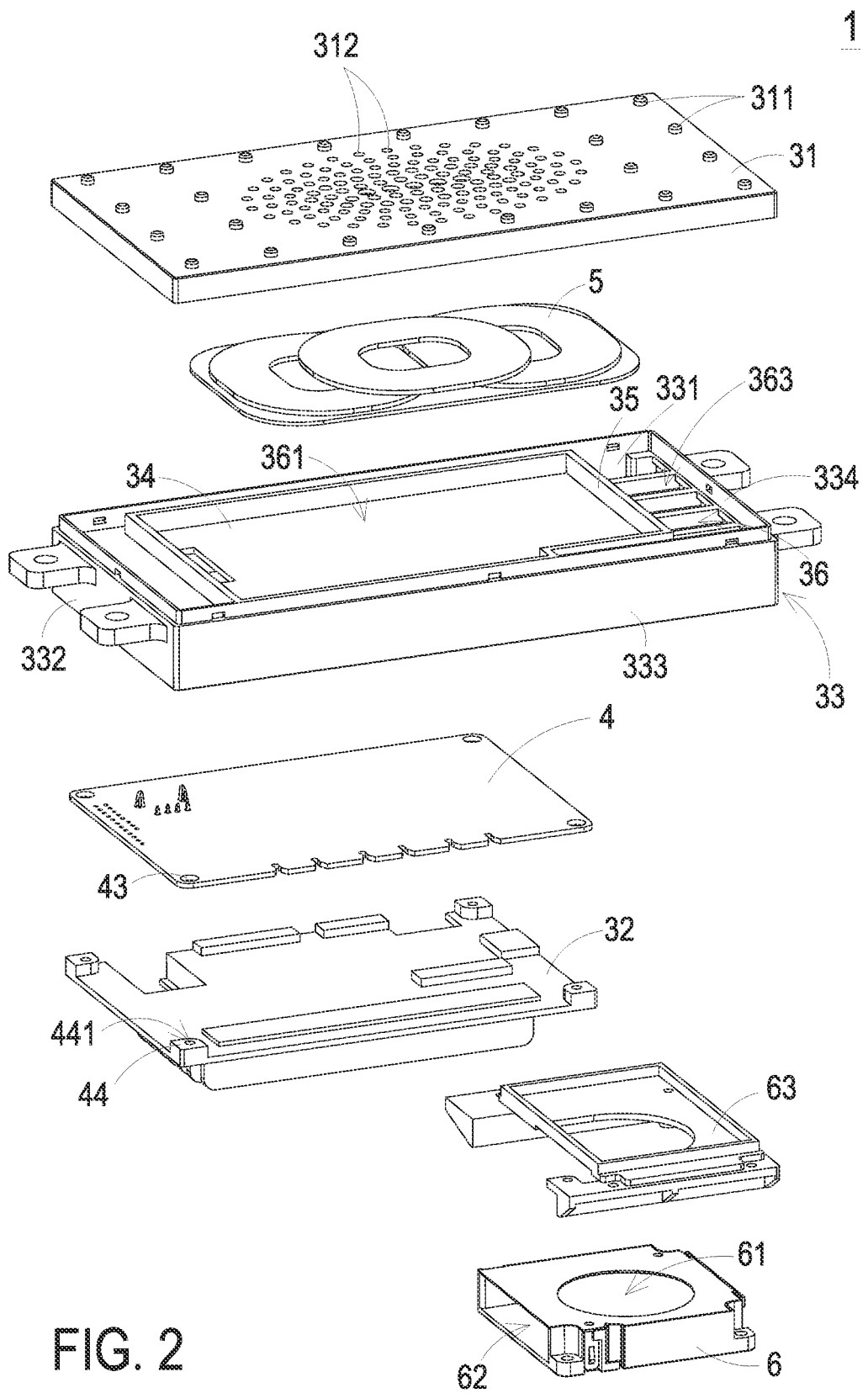
FIG. 2 is a schematic exploded view illustrating the wireless charging device as shown in FIG. 1.
Figure 3:
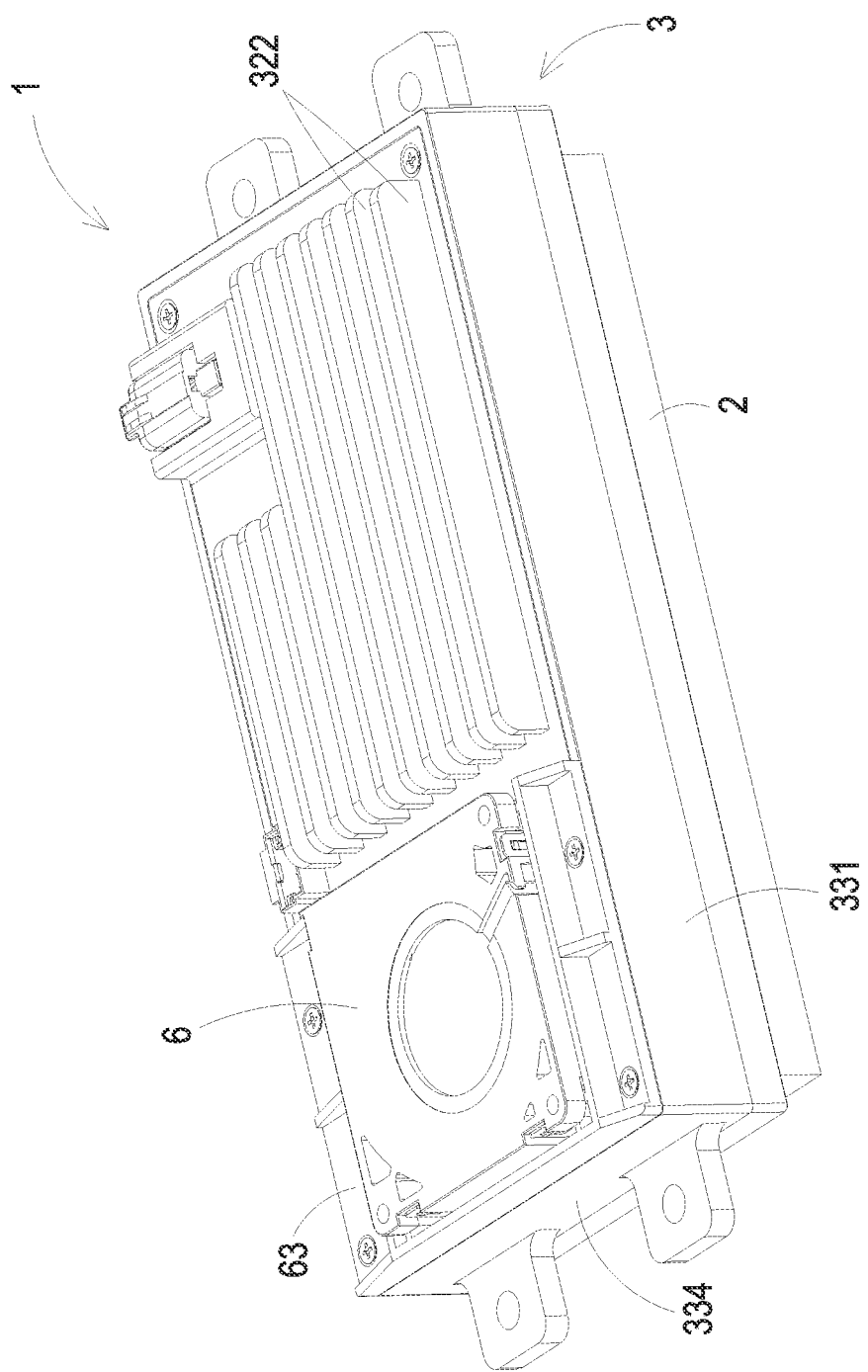
FIG. 3 is a schematic perspective view illustrating the wireless charging device as shown in FIG. 1 taken along another viewpoint.
Figure 4:
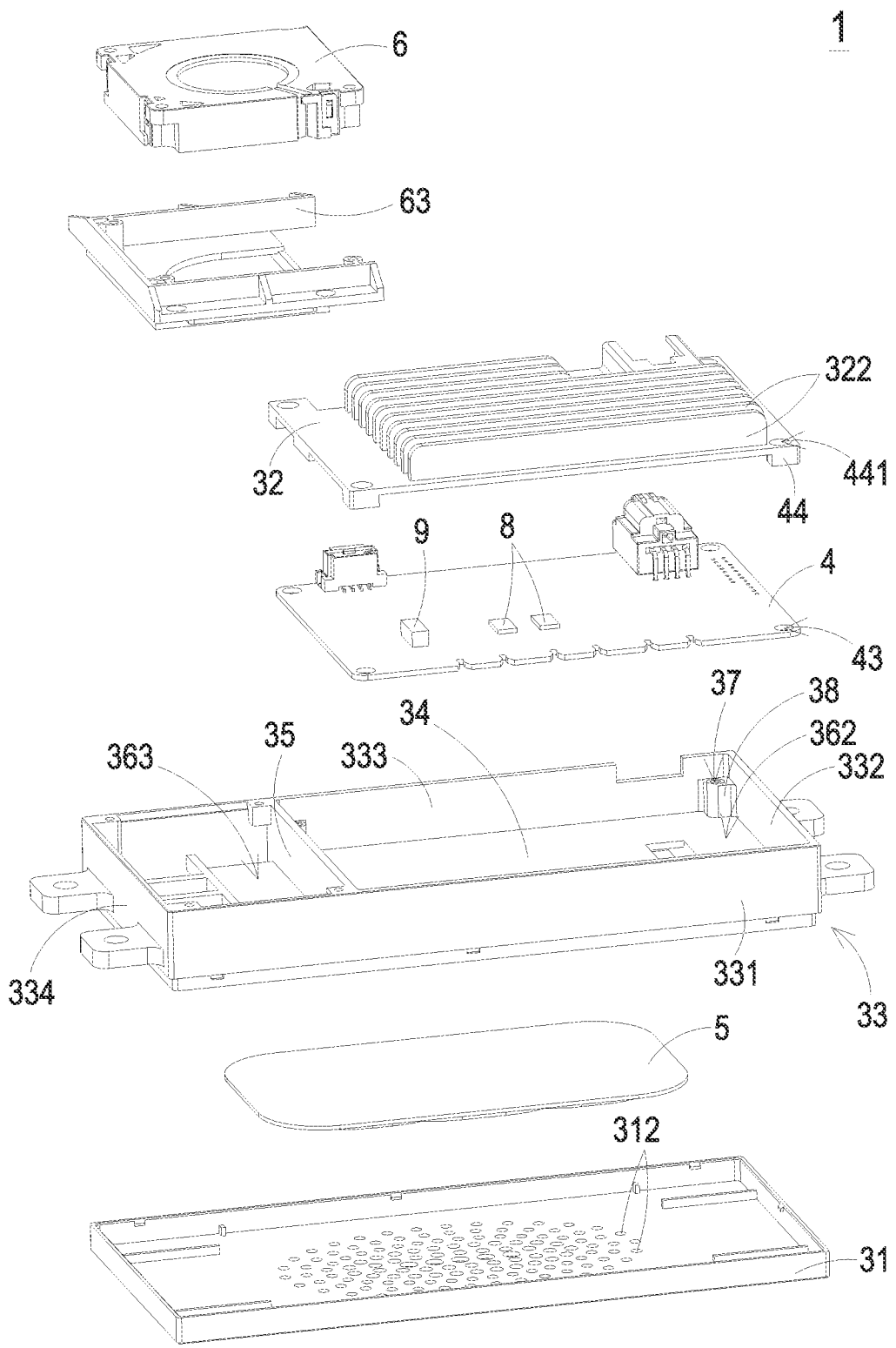
FIG. 4 is a schematic exploded view illustrating the wireless charging device as shown in FIG. 1 taken along another viewpoint.
Figure 5:
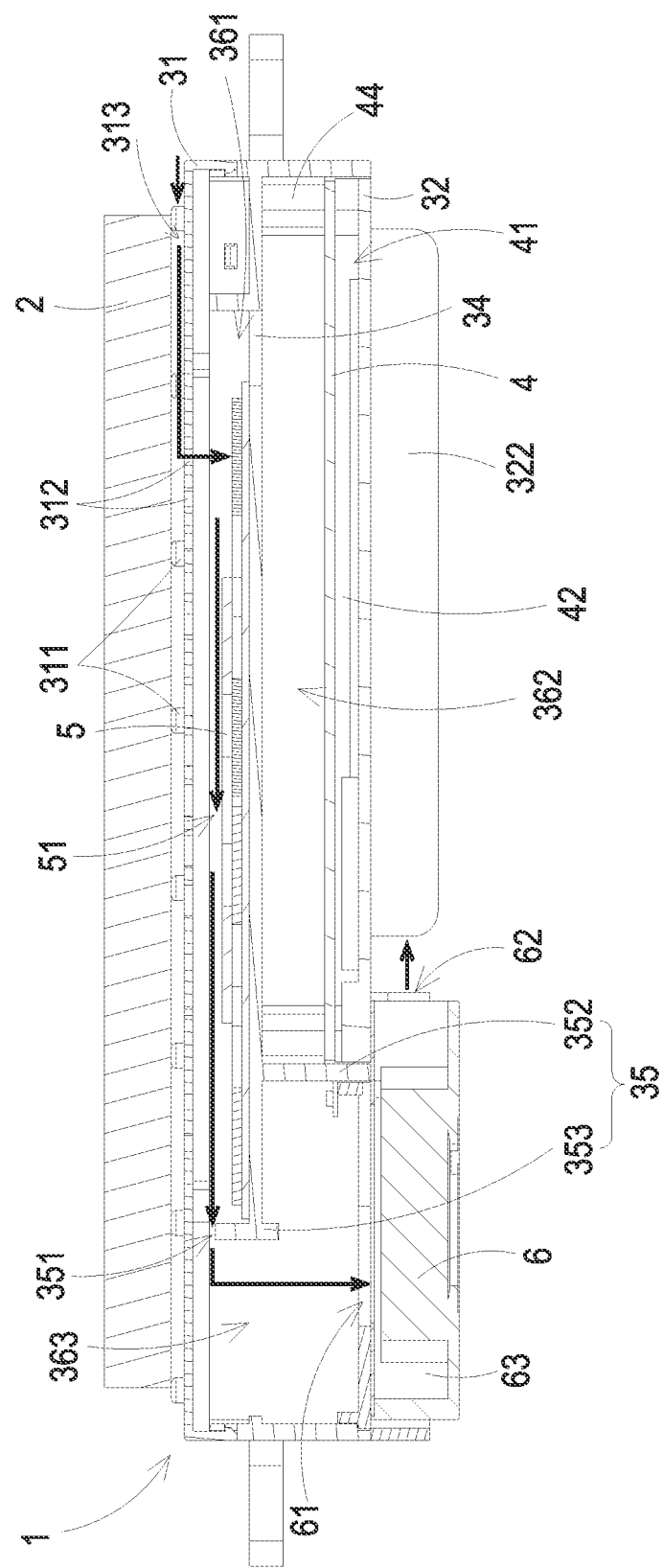
FIG. 5 is a schematic cross-sectional view illustrating the wireless charging device and the mobile device as shown in FIG. 1 taken along the line A-A'.
Figure 6:
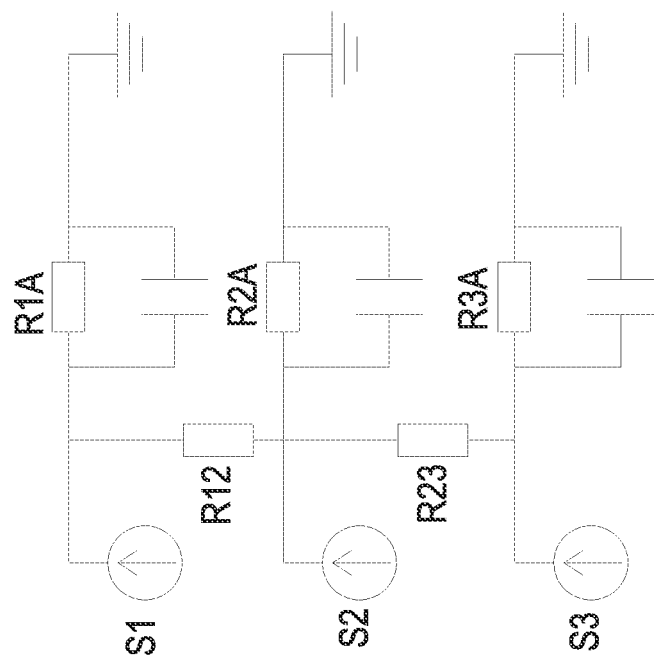
FIG. 6 is an equivalent thermal circuit of the wireless charging device as shown in FIG. 1.

Please refer to FIGS. 1 to 6. FIG. 1 is a schematic perspective view illustrating the appearance of a wireless charging device with a mobile device disposed thereon according to a first embodiment of the present disclosure. FIG. 2 is a schematic exploded view illustrating the wireless charging device as shown in FIG. 1. FIG. 3 is a schematic perspective view illustrating the wireless charging device as shown in FIG. 1 taken along another viewpoint. FIG. 4 is a schematic exploded view illustrating the wireless charging device as shown in FIG. 1 taken along another viewpoint. FIG. 5 is a schematic cross-sectional view illustrating the wireless charging device and the mobile device as shown in FIG. 1 taken along the line A-A'. FIG. 6 is an equivalent thermal circuit of the wireless charging device as shown in FIG. 1. As shown in FIGS. 1 and 5, in the embodiment, a wireless charging device 1 is provided to carry a mobile device 2. The wireless charging device 1 is used for wirelessly charging the mobile device 2. The mobile device 2 includes a receiver coil (not shown) therein. As shown in FIG. 6, during an operation of the wireless charging device 1, a first heat source S1 is generated from the receiver coil. The receiver coil located in the mobile device 2 has a receiver coil thermal resistance R1A. In this embodiment, the wireless charging device 1 includes a casing 3, a transmitter driving board 4, a transmitter coil assembly 5 and a fan 6.

As shown in FIG. 2, the casing 3 includes a top plate 31, a bottom plate 32, a plurality of lateral walls 33, a partition plate 34, a supporting wall 35 and an accommodation space 36. The top plate 31 is disposed at a top of the casing 3, so that the mobile device 2 can be disposed on the top plate 31. In some embodiments, the top plate 31 is made of a non-metallic material. Preferably but not exclusively, the top plate 31 is a plastic plate or a printed circuit board (PCB). The bottom plate 32 is disposed at a bottom of the casing 3. The bottom plate 32 and the top plate 31 are disposed on two opposite sides of the casing 3, respectively. In some embodiments, the bottom plate 32 is made of a metallic material having an advantage of heat dissipation.

The top plate 31 includes an upper surface, a lower surface, a plurality of protrusion portions 311 and a plurality of holes 312. The upper surface and the lower surface of the top plate 31 are opposite to each other. The plurality of protrusion portions 311 are extended from the upper surface of the top plate 31 faced away the bottom plate 32. The mobile device 2 is supported by the plurality of protrusion portions 311, so as to form a first gap 313 between the top plate 31 of the casing 3 and the mobile device 2, as shown in FIG. 5. Consequently, an external airflow is allowed to flow through the first gap 313. The plurality of holes 312 run through the top plate 31 and in communication with the first gap 313. The plurality of holes 312 are formed as a main inlet of the wireless charging device 1 for receiving the external airflow.

In this embodiment, the plurality of lateral walls 33 includes a first lateral wall 331, a second lateral wall 332, a third lateral wall 333 and a fourth lateral wall 334, as shown in FIG. 2. The first lateral wall 331, the second lateral wall 332, the third lateral wall 333 and the fourth lateral wall 334 are surrounding disposed between the top plate 31 and the bottom plate 32. The first lateral wall 331 and the third lateral wall 333 are opposite to each other. Namely, the extension direction of the first lateral wall 331 is parallel to the extension direction of the third lateral wall 333. The second lateral wall 332 and the fourth lateral wall 334 are opposite to each other and disposed between the first lateral wall 331 and the third lateral wall 333. The accommodation space 36 is defined by the first lateral wall 331, the second lateral wall 332, the third lateral wall 333, the fourth lateral wall 334, the top plate 31 and the bottom plate 32 collaboratively.

The partition plate 34 is disposed between the top plate 31 and the bottom plate 32 and connected with the first lateral wall 331, the second lateral wall 332 and the third lateral wall 333. Preferably but not exclusively, the partition plate 34 is parallel to the top plate 31 and the bottom plate 32, respectively. The partition plate 34 is perpendicular to the first lateral wall 331, the second lateral wall 332 and the third lateral wall 333, respectively.

The supporting wall 35 is located between the top plate 31 and the bottom plate 32. The supporting wall 35 is connected with the bottom plate 32, the partition plate 34, the first lateral wall 331 and the third lateral wall 333. The supporting wall 35 includes a first sub supporting portion 352 and a second sub supporting portion 353. The first sub supporting portion 352 is perpendicular to the bottom plate 32 and connected to one side of the bottom plate 32. The first sub supporting portion 352 is perpendicular to the partition plate 34 and connected to a lower surface of the partition plate 34. The second sub supporting portion 353 is perpendicular to the partition plate 34 and connected to one of the plurality of lateral surfaces of partition plate 34. As shown in FIG. 5, a second gap 351 is formed between the second sub supporting portion 353 and the lower surface of the top plate 31. Preferably but not exclusively, the plurality of lateral walls 33, the partition plate 34, the first sub supporting portion 352 and the second sub supporting portion 353 of the supporting wall 35 are made of a metallic material and integrally formed into one piece.

The accommodation space 36 is divided into a first accommodation space 361, a second accommodation space 362 and a third accommodation space 363 through the first sub supporting portion 352, the second sub supporting portion 353 of the supporting wall 35 and the partition plate 34. The first accommodation space 361 is located between the lower surface of the top plate 31 and an upper surface of the partition plate 34. The second accommodation space 362 is located between the lower surface of the partition plate 34 and an upper surface of the bottom plate 32. The second sub supporting portion 353 of the supporting wall 35 is disposed between the third accommodation space 363 and the first accommodation space 361. The first sub supporting portion 352 of the supporting wall 35 is disposed between the third accommodation space 363 and the second accommodation space 362. In this embodiment, the first accommodation space 361 is defined by the top plate 31, the partition plate 34, the second sub supporting portion 353 of the supporting wall 35, the first lateral wall 331, the second lateral wall 332 and the third lateral wall 333 collaboratively. The second accommodation space 362 is defined by the bottom plate 32, the partition plate 34, the first sub supporting portion 352 of the supporting wall 35, the first lateral wall 331, the second lateral wall 332 and the third lateral wall 333 collaboratively. The third accommodation space 363 is defined by the top plate 31, the bottom plate 32, the first sub supporting portion 352, the second sub supporting portion 353 of the supporting wall 35, the partition plate 34, the first lateral wall 331, the third lateral wall 333 and the fourth lateral wall 334 collaboratively. The first accommodation space 361 and the second accommodation space 362 are located between the third accommodation space 363 and the second lateral wall 332, respectively. As shown in FIG. 5, the second gap 351 is in communication with the first accommodation space 361 and the third accommodation space 363. The first accommodation space 361 is in communication with the plurality of holes 312, so that the external airflow received by the plurality of holes 312 is exhaled to the third accommodation space 363 through the first accommodation space 361 and the second gap 351 in sequence, as shown in the arrow of FIG. 5.

The transmitter driving board 4 is accommodated in the second accommodation space 362 and disposed between the partition plate 34 and the bottom plate 32 so as to dissipate the heat through the bottom plate 32 during the operation of the wireless charging device 1. The transmitter driving board 4 includes an upper surface and a lower surface. The upper surface and the lower surface of the transmitter driving board 4 are opposite to each other. The transmitter driving board 4 is electrically connected with an external electric power source (not shown) through a connect cable (not shown) for receiving the external electric power outputted by the external electric power source. During the operation of the wireless charging device 1, the transmitter driving board 4 receives and converts the external electric power outputted by the external electric power source into a driving electric energy. As shown in FIG. 6, a third heat source S3 is generated from the transmitter driving board 4 during the operation of the wireless charging device 1. The transmitter driving board 4 has a transmitter driving board thermal resistance R3A with respect to the surroundings. In this embodiment, the distance formed between the transmitter driving board 4 and the bottom plate 32 is less than the distance formed between the transmitter driving board 4 and the partition plate 34. The heat generated from the transmitter driving board 4 is preferentially dissipated through the bottom plate 32. Namely, the heat transferred from the transmitter driving board 4 to the bottom plate 32 is greater than the heat transferred from the transmitter driving board 4 to the partition plate 34.

The transmitter coil assembly 5 is disposed in the first accommodation space 361 and located between the top plate 31 and the partition plate 34. In this embodiment, the transmitter coil assembly 5 is attached to the partition plate 34. The transmitter coil assembly 5 is electromagnetically coupled with the receiver coil located in the mobile device 2. During the operation of the wireless charging device 1, the driving electric energy outputted from the transmitter driving board 4 is received by the transmitter coil assembly 5. Moreover, the driving electric energy is electromagnetically coupled with the receiver coil located in the mobile device 2 through the transmitter coil assembly 5, so that the mobile device 2 is wirelessly charged by the receiver coil of the mobile device 2. As shown in FIG. 6, during the operation of the wireless charging device 1, a second heat source S2 is generated from the transmitter coil assembly 5. The transmitter coil assembly 5 has a transmitter coil assembly thermal resistance R2A with respect to the surroundings. Moreover, a first interfacial thermal resistance R12 is generated between the transmitter coil assembly 5 and the receiver coil located in the mobile device 2. A second interfacial thermal resistance R23 is generated between the transmitter coil assembly 5 and the transmitter driving board 4. According to FIG. 6, in case of that the first interfacial thermal resistance R12 is less than the receiver coil thermal resistance R1A or the transmitter coil assembly thermal resistance R2A, the heat is preferentially transferred between the transmitter coil assembly 5 and the receiver coil located in the mobile device 2. In case of that the first interfacial thermal resistance R12 is greater than the receiver coil thermal resistance R1A and the transmitter coil assembly thermal resistance R2A, the heat is hardly transferred between the transmitter coil assembly 5 and the receiver coil located in the mobile device 2. Similarly, in case of that the second interfacial thermal resistance R23 is less than the transmitter coil assembly thermal resistance R2A or the transmitter driving board thermal resistance R3A, the heat is preferentially transferred between the transmitter coil assembly 5 and the transmitter driving board 4. In case of that the second interfacial thermal resistance R23 is greater than the transmitter coil assembly thermal resistance R2A and the transmitter driving board thermal resistance R3A, the heat is hardly transferred between the transmitter coil assembly 5 and the transmitter driving board 4. As shown in FIG. 5, a third gap 51 is formed between the transmitter coil assembly 5 and the top plate 31. Namely, the transmitter coil assembly 5 is disposed adjacent to the third gap 51. The third gap 51 is in communication with the plurality of holes 312 and the second gap 351. The first gap 313, the plurality of holes 312, the third gap 51, the second gap 351 and the third accommodation space 363 are in communication with each other so as to form an airflow channel. Consequently, the external airflow is allowed to flow through the first gap 313, the plurality of holes 312, the third gap 51, the second gap 351 and the third accommodation space 363 in sequence, so that the heat generated from the transmitter coil assembly 5 adjacent to the third gap 51 is dissipated by the external airflow.

The fan 6 is disposed on a lower surface of the bottom plate 32 of the casing 3 and located in the exterior of the casing 3. Preferably but not exclusively, the fan 6 is a centrifugal fan. The fan 6 includes an inlet 61 and an outlet 62, as shown in FIGS. 2 and 5. The inlet 61 is disposed adjacent to the third accommodation space 363 and in communication with the third accommodation space 363. The airflow of the airflow channel is inhaled to the fan 6 through the inlet 61. The outlet 62 is disposed adjacent to the bottom plate 32 so as to form a main outlet of the wireless charging device 1. The airflow inhaled form the inlet 61 is discharged out through the outlet 62. The airflow direction exhaled from the outlet 62 is perpendicular to the airflow direction inhaled from the inlet 61 and parallel to the bottom plate 32, so that the heat dissipated from the bottom plate 32 is discharged out through the airflow exhaled from the outlet 62.

As mentioned above, in the wireless charging device 1 of the present disclosure, the plurality of protrusion portions 311 are utilized to form the first gap 313 between the top plate 31 and the mobile device 2, so as to increase the distance formed between the top plate 31 and the mobile device 2. Consequently, the first interfacial thermal resistance R12 formed between the transmitter coil assembly 5 and the receiver coil located in the mobile device 2 is increased, and the second heat source S2 generated from the transmitter coil assembly 5 is dissipated through the airflow flowed through the first gap 313 instead of being transferred to the receiver coil located in the mobile device 2. In that, the temperature of the mobile device 2 is controlled to be under the tolerance temperature threshold value during the charging process of the wireless charging device 1. Consequently, the charging power is enhanced, and the charging speed is increased. Moreover, with the first gap 313 formed between the top plate 31 and the mobile device 2, the external airflow is inhaled to the interior of the wireless charging device 1 through the first gap 313, so that the heat dissipation performance of the wireless charging device 1 is enhanced. Furthermore, the third gap 51 is formed between the transmitter coil assembly 5 and the top plate 31, and the first accommodation space 361, the second accommodation space 362 and the third accommodation space 363 are formed through the partition plate 34 and the supporting wall 35 for enhancing the heat dissipating performance of the elements located in the wireless charging device 1. In addition, the first gap 313, the plurality of holes 312, the third gap 51, the second gap 351 and the third accommodation space 363 of the wireless charging device 1 are in communication with each other to form the airflow channel, so that the heats generated from the mobile device 2 and the elements (i.e., the transmitter coil assembly 5 and the transmitter driving board 4) located in the wireless charging device 1 are dissipated simultaneously through the airflow channel. Namely, in the mobile device 2, the receiver coil thermal resistance R1A of the receiver coil of the mobile device 2, the transmitter coil assembly thermal resistance R2A of the transmitter coil assembly 5 and the transmitter driving board thermal resistance R3A of the transmitter driving board 4 are reduced simultaneously. Moreover, when the external airflow flows through the first gap 313, the plurality of holes 312, the third gap 51, the second gap 351 and the third accommodation space 363 in sequence, since the mobile device 2 is heat-sensitive, the heat generated from the mobile device 2 is dissipated preferentially, and then the heat generated from the transmitter coil assembly 5 is dissipated. Afterward, the heat generated from the transmitter driving board 4 adjacent to the bottom plate 32 is dissipated through the fan 6. Moreover, the wireless charging device 1 of the present disclosure includes a fan 6 for accelerating the speed of the airflow of the airflow channel so that the heat dissipating performance of the bottom plate 32 is enhanced. Moreover, the transmitter driving board 4 is not disposed in the airflow channel, so that the airflow is allowed to flow through the airflow channel without contacting the transmitter driving board 4 directly, and the transmitter driving board 4 of the wireless charging device 1 has waterproof and dustproof functions. Furthermore, since the distance formed between the transmitter driving board 4 and the bottom plate 32 is less than the distance formed between the transmitter driving board 4 and the partition plate 34, the second interfacial thermal resistance R23 generated between the transmitter coil assembly 5 and the transmitter driving board 4 is increased. In that, the third heat source S3 generated from the transmitter driving board 4 is transferred to the bottom plate 32 easily, and the heat is dissipated away from the bottom plate through the airflow exhaled from the fan 6. Thus, the heat dissipating performance of the transmitter driving board 4 is enhanced.

Please refer to FIG. 5 again. In some embodiments, the partition plate 34 of the casing 3 is made of a metallic material. The transmitter coil assembly 5 is disposed in the first accommodation space 361 and in contact with the partition plate 34. Consequently, the heat generated from the transmitter coil assembly 5 is dissipated through the partition plate 34.

In some embodiments, as shown in FIGS. 4 and 5, the bottom plate 32 includes a plurality of heat dissipation fins 322. The plurality of heat dissipation fins 322 are extended from the lower surface of the bottom plate 3 faced toward the exterior of the casing 3. The outlet 62 of the fan 6 is disposed adjacent to the plurality of heat dissipation fins 322 of the bottom plate 32. The plurality of heat dissipation fins 322 are arranged sequentially. Namely, a channel is formed between adjacent two of the plurality of heat dissipation fins 322. Preferably but not exclusively, each one of the plurality of heat dissipation fins 322 is perpendicular to the bottom plate 32. The channel formed between adjacent two of the plurality of heat dissipation fins 322 is parallel to the airflow direction exhaled from the outlet 62 of the fan 6. Consequently, the airflow exhaled from the outlet 62 of the fan flows through the channel formed between adjacent two of the plurality of heat dissipation fins 322 so as to enhance the heat dissipating performance of the wireless charging device 1 quickly.

In some embodiments, as shown in FIG. 4, the wireless charging device 1 includes a plurality of switching elements 8 for controlling the operation of the wireless charging device 1. The plurality of switching elements 8 are disposed on the lower surface of the transmitter driving board 4 adjacent to the bottom plate 32. Namely, the thermal resistance formed between the switching element 8 and the bottom plate 32 is minimal. Consequently, the heat generated from the plurality of switching elements 8 is preferentially transferred to the bottom plate 32 for dissipating the heat. The wireless charging device 1 further includes an inductor 9 disposed on the lower surface of the transmitter driving board 4 adjacent to the bottom plate 32. Namely, the thermal resistance formed between the inductor 9 and the bottom plate 32 is minimal. Consequently, the heat generated from the inductor 9 is preferentially transferred to the bottom plate 32 for dissipating the heat. In some embodiments, the wireless charging device 1 further includes a fan holder 63 connected with first lateral wall 331, the third lateral wall 333 and the fourth lateral wall 334 of the casing 3, and adjacent to the bottom plate 32 of the casing 3 for fixing the fan 6 on the bottom plate 32. In some embodiments, the transmitter driving board 4 includes a first penetration hole 43 run through the transmitter driving board 4. The casing 3 includes a plurality of fixing portions 38 extended from the lower surface of the partition plate 34 toward the bottom plate 32. Each one of the plurality of fixing portions 38 includes a second penetration hole 37. The second penetration hole 37 runs through the corresponding fixing portion 38 and includes a screw thread. The bottom plate 32 further includes a plurality of connection portions 44. The plurality of connection portions 44 are extended from the upper surface of the bottom plate 32 toward the transmitter driving board 4. Each one of the plurality of connection portions 44 includes a third penetration hole 441. The third penetration hole 441 runs through the connection portion 44. The third penetration hole 441 is spatially corresponding in position to the first penetration hole 43 of the transmitter driving board 4 and the second penetration hole 37 of the fixing portion 38 of the casing 3. Consequently, the wireless charging device 1 includes a screw or a bolt (not shown). The screw (or the bolt) is utilized to pass through the third penetration hole 441 on the connection portion 44, the first penetration hole 43 of the transmitter driving board 4 and the second penetration hole 37 of the casing 3 in sequence, so as to fix and support the transmitter driving board 4 on the casing 3, so that the transmitter driving board 4 is fixed on the bottom plate 32 firmly.

Please refer to FIG. 5. A fourth gap 41 is formed between the transmitter driving board 4 and the bottom plate 32. The wireless charging device 1 further includes a connection material 42. Preferably but not exclusively, the connection material 42 is made of a flexibility material with high thermal conductivity. The connection material 42 is disposed in the fourth gap 41 connected between the transmitter driving board 4 and the bottom plate 32. Consequently, the heat generated from the transmitter driving board 4 is preferentially dissipated to the bottom plate 32 through the connection material 42 due to high thermal conductivity of the connection material 42, and then the heat is dissipated to the surroundings through the bottom plate 32. In some embodiments, the connection material 42 is thermal conductive glue or thermal conductive pad.

Figure 7:
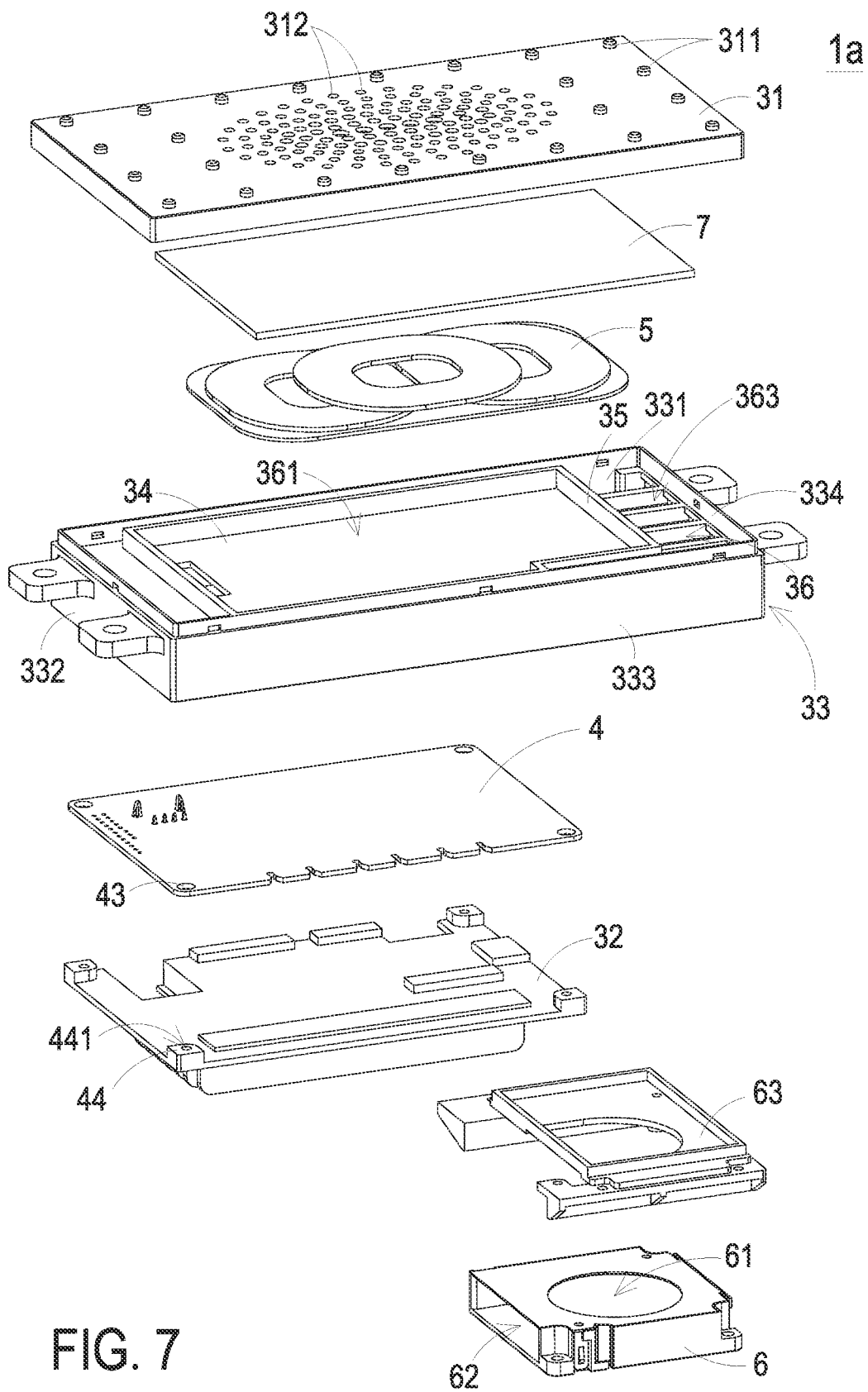
FIG. 7 is a schematic exploded view illustrating the appearance of a wireless charging device according to a second embodiment of the present disclosure.
Figure 8:
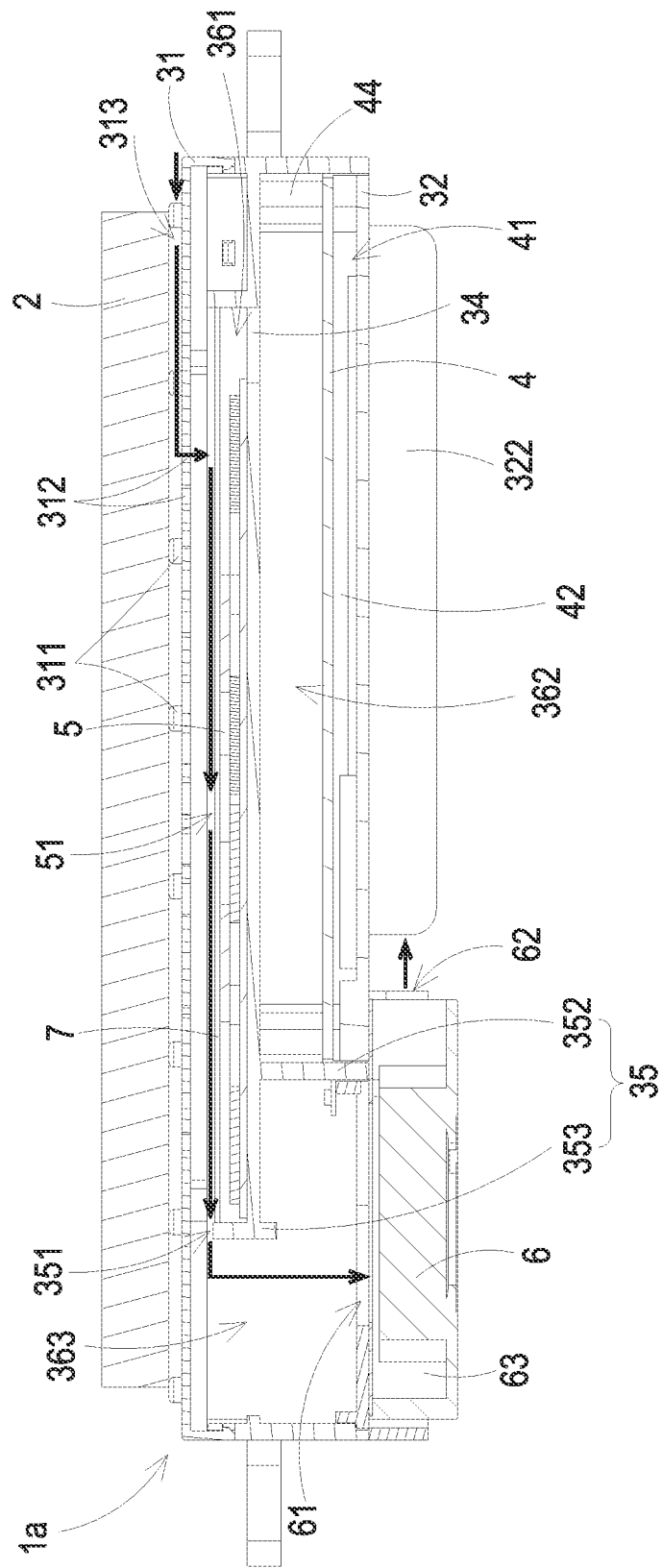
FIG. 8 is a schematic cross-sectional view illustrating the wireless charging device and the mobile device as shown in FIG. 7 taken along the line A-A'.

Please refer to FIGS. 7 and 8. FIG. 7 is a schematic exploded view illustrating a wireless charging device according to a second embodiment of the present disclosure. FIG. 8 is a schematic cross-sectional view illustrating the wireless charging device and the mobile device as shown in FIG. 7 taken along the line A-A'. Compared with the wireless charging device 1 of FIG. 2, the wireless charging device 1a of this embodiment further includes a wireless communication plate 7. Preferably but not exclusively, the wireless communication plate 7 is made of near-field communication plate. As shown in FIGS. 7 and 8, the wireless communication plate 7 is disposed in the first accommodation space 361 and adjacent to the second gap 351. The wireless communication plate 7 is disposed between the top plate 31 and the transmitter coil assembly 5, so that the wireless charging device 1a has wireless communication function. Moreover, the wireless communication plate 7 is disposed adjacent to the airflow channel of the wireless charging device 1a. In this embodiment, the wireless communication plate 7 is disposed adjacent to the second gap 351. The heat generated from the wireless communication plate 7 is preferentially dissipated through the airflow of the airflow channel flowed through the second gap 351 instead of being transferred to the transmitter coil assembly 5. The airflow direction of this embodiment is shown as the arrow of FIG. 8 and similar to the airflow direction of FIG. 5, and detailed descriptions thereof are omitted.

From the above descriptions, the present disclosure provides the wireless charging device. In the wireless charging device of the present disclosure, the plurality of protrusion portions are utilized to form the first gap between the top plate and the mobile device, so as to increase the distance formed between the top plate and the mobile device. Consequently, the first interfacial thermal resistance formed between the transmitter coil assembly and the receiver coil located in the mobile device is increased, and the second heat source generated from the transmitter coil assembly is dissipated through the wireless charging device instead of being transferred to the receiver coil located in the mobile device. In that, the temperature of the mobile device is controlled to be under the tolerance temperature threshold value during the charging process of the wireless charging device. Consequently, the charging power is enhanced, and the charging speed is increased. Moreover, with the first gap formed between the top plate and the mobile device, the external airflow is inhaled to the interior of the wireless charging device through the first gap, so that the heat dissipation performance of the wireless charging device is enhanced. Furthermore, the third gap is formed between the transmitter coil assembly and the top plate, and the first accommodation space, the second accommodation space and the third accommodation space are formed through the partition plate and the supporting wall for enhancing the heat dissipating performance of the elements located in the wireless charging device. In addition, the first gap, the plurality of holes, the third gap, the second gap and the third accommodation space of the wireless charging device are in communication with each other to form the airflow channel, so that the heats generated from the mobile device and the elements (i.e., the transmitter coil assembly and the transmitter driving board) located in the wireless charging device are dissipated simultaneously through the airflow channel. Namely, in the mobile device, the receiver coil thermal resistance of the receiver coil of the mobile device, the transmitter coil assembly thermal resistance of the transmitter coil assembly and the transmitter driving board thermal resistance of the transmitter driving board are reduced simultaneously. Moreover, when the external airflow flows through the first gap, the plurality of holes, the third gap, the second gap and the third accommodation space in sequence, since the mobile device is heat-sensitive, the heat generated from the mobile device is dissipated preferentially, and then the heat generated from the transmitter coil assembly is dissipated. Afterward, the heat generated from the transmitter driving board adjacent to the bottom plate is dissipated through the fan 6. Moreover, the wireless charging device of the present disclosure includes a fan for accelerating the speed of the airflow of the airflow channel so that the heat dissipating performance of the bottom plate is enhanced. Moreover, the transmitter driving board is not disposed in the airflow channel, so that the airflow is allowed to flow through the airflow channel without contacting the transmitter driving board directly, and the transmitter driving board of the wireless charging device has waterproof and dustproof functions. Furthermore, since the distance formed between the transmitter driving board and the bottom plate is less than the distance formed between the transmitter driving board and the partition plate, the second interfacial thermal resistance generated between the transmitter coil assembly and the transmitter driving board is increased. In that, the third heat source generated from the transmitter driving board is transferred to the bottom plate easily, and the heat is dissipated away from the bottom plate through the airflow exhaled from the fan. Thus, the heat dissipating performance of the transmitter driving board is enhanced.

While the invention has been described in terms of what is presently considered to be exemplary embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless charging device for wirelessly charging a mobile device, wherein the mobile device comprises a receiver coil, and the wireless charging device comprises:
    a casing comprising a top plate, a bottom plate, a plurality of lateral walls, a partition plate, a supporting wall and an accommodation space, wherein the top plate and the bottom plate are opposite to each other, the top plate comprises an upper surface, a lower surface, a plurality of protrusion portions and a plurality of holes, the upper surface and the lower surface of the top plate are opposite to each other, the plurality of protrusion portions are extended from the upper surface of the top plate faced away the bottom plate, and the mobile device is disposed on the top plate through the plurality of protrusion portions, so as to form a first gap between the top plate and the mobile device, and the plurality of holes run through the top plate, the partition plate and the supporting wall are disposed between the top plate and the bottom plate, respectively, the supporting wall is directly and perpendicularly connected to the partition plate and the bottom plate, and a second gap is formed between the supporting wall and the top plate, wherein the accommodation space is divided into a first accommodation space, a second accommodation space and a third accommodation space through the partition plate and the supporting wall, the first accommodation space is located between the top plate and the partition plate, the second accommodation space is located between the partition plate and the bottom plate, and the supporting wall is located between the first accommodation space and the third accommodation space;
    a transmitter driving board disposed in the second accommodation space for receiving and converting an external electric energy into a driving electric energy during an operation of the wireless charging device;
    a transmitter coil assembly disposed in the first accommodation space and electromagnetically coupled with the receiver coil, wherein the transmitter coil assembly receives the driving electric energy from the transmitter driving board and transfers the driving electric energy to the receiver coil during the operation of the wireless charging device, so that the mobile device is wirelessly charged by the driving electric energy, wherein a third gap is formed between the transmitter coil assembly and the top plate, and a first airflow channel is formed by the first gap, the plurality of holes, the third gap, the second gap and the third accommodation space collaboratively, so that an airflow is allowed to flow through the first airflow channel; and
    a fan comprising an inlet and an outlet, wherein the inlet is disposed adjacent to the third accommodation space, the outlet is disposed adjacent to the bottom plate, and the airflow flowing through the first airflow channel is inhaled to the fan through the inlet and discharged out through the outlet.

2. The wireless charging device according to claim 1, wherein the supporting wall comprises a first sub supporting portion and a second sub supporting portion, the first sub supporting portion is perpendicular to the bottom plate and connected to one side of the bottom plate, and the first sub supporting portion is perpendicular to the partition plate and connected to a lower surface of the partition plate, wherein the second sub supporting portion is perpendicular to the partition plate and connected to one side of the partition plate, and the second gap is formed between the second sub supporting portion and the top plate.

3. The wireless charging device according to claim 1, wherein the plurality of lateral walls are surrounding disposed between the top plate and the bottom plate, wherein the plurality of lateral walls comprises a first lateral wall, a second lateral wall, a third lateral wall and a fourth lateral wall, the first lateral wall and the third lateral wall are opposite to each other, the second lateral wall and the fourth lateral wall are opposite to each other, the first accommodation space is defined by the top plate, the partition plate, the supporting wall, the first lateral wall, the second lateral wall and the third lateral collaboratively, the second accommodation space is defined by the bottom plate, the partition plate, the supporting wall, the first lateral wall, the second lateral wall and the third lateral wall collaboratively, and the third accommodation space is defined by the top plate, the bottom plate, the supporting wall, the partition plate, the first lateral wall, the third lateral wall and the fourth lateral wall collaboratively, wherein the first accommodation space and the second accommodation space are located between the third accommodation space and the second lateral wall, respectively.

4. The wireless charging device according to claim 1, wherein the top plate is made of a non-metallic material, wherein the bottom plate, the plurality of lateral walls, the partition plate and the supporting wall are made of a metallic material, respectively.

5. The wireless charging device according to claim 1, wherein the transmitter coil assembly is attached to the partition plate.

6. The wireless charging device according to claim 1, wherein a fourth gap is formed between the transmitter driving board and the bottom plate.

7. The wireless charging device according to claim 6, further comprising a connection material, wherein the connection material is made of a flexibility material with high thermal conductivity, and the connection material is disposed in the fourth gap and connected between the transmitter driving board and the bottom plate.

8. The wireless charging device according to claim 1, wherein the transmitter driving board comprises a first penetration hole, wherein the casing comprises a second penetration hole disposed on the partition plate, faced toward the bottom plate, wherein the bottom plate comprises a connection portion extended from the bottom plate toward the transmitter driving board, and the connection portion comprises a third penetration hole disposed thereon, and the third penetration hole is spatially corresponding in position to the first penetration hole and the second penetration hole, wherein the wireless charging device comprises a screw or a bolt utilized to pass through the third penetration hole on the connection portion, the first penetration hole of the transmitter driving board and the second penetration hole of the partition plate in sequence, so as to fix and support the transmitter driving board on the casing.

9. The wireless charging device according to claim 1, wherein the bottom plate comprises a plurality of heat dissipation fins, the plurality of heat dissipation fins are extended from the bottom plate toward an exterior of the casing, and the outlet of the fan is disposed adjacent to the plurality of heat dissipation fins of the bottom plate.

10. The wireless charging device according to claim 9, wherein a second airflow channel is formed between each adjacent two of the plurality heat dissipation fins, and the second airflow channel is parallel to an airflow direction exhaled from the outlet of the fan.

11. The wireless charging device according to claim 1, further comprising a plurality of switching elements and at least one inductor, wherein the plurality of switching elements and the at least one inductor are disposed on a lower surface of the transmitter driving board and located adjacent to the bottom plate.

12. The wireless charging device according to claim 1, further comprising a fan holder, wherein the fan holder is connected to the bottom plate of the casing for fixing the fan.

13. The wireless charging device according to claim 1, further comprising a wireless communication plate disposed between the transmitter coil assembly and the top plate.

14. The wireless charging device according to claim 1, wherein the plurality of lateral walls, the partition plate and the supporting wall are integrally formed into one piece.

15. The wireless charging device according to claim 7, wherein the connection material is thermal conductive glue or thermal conductive pad.

* * * * *